United States Patent
Bramante

(10) Patent No.: US 7,111,741 B2
(45) Date of Patent: Sep. 26, 2006

(54) MULTI-PURPOSE RAKE

(76) Inventor: Joseph Bramante, 1 Sanborn Rd., Derry, NH (US) 03038

( * ) Notice: Subject to any disclaimer, the term of this patent is extended or adjusted under 35 U.S.C. 154(b) by 245 days.

(21) Appl. No.: 10/819,837

(22) Filed: Apr. 6, 2004

(65) Prior Publication Data

US 2005/0218044 A1    Oct. 6, 2005

(51) Int. Cl.
*B07C 7/04* (2006.01)

(52) U.S. Cl. .................. 209/614; 209/615; 209/417; 209/419; 209/418; 294/2

(58) Field of Classification Search ............... 209/614, 209/615, 417, 418, 419; 294/2
See application file for complete search history.

(56) References Cited

U.S. PATENT DOCUMENTS

| | | | | |
|---|---|---|---|---|
| 1,014,250 A * | 1/1912 | Mack | ................ | 56/400.11 |
| 3,614,149 A * | 10/1971 | Clark | ................ | 294/19.2 |
| 3,663,049 A * | 5/1972 | James | ................ | 294/19.2 |
| 3,863,237 A * | 1/1975 | Doerr | ................ | 15/1.7 |
| 4,054,313 A * | 10/1977 | Ciuci | ................ | 294/53.5 |
| 4,190,279 A * | 2/1980 | Sguazzin | ................ | 294/49 |
| 4,198,720 A * | 4/1980 | Matsumoto | ................ | 15/1.7 |
| 4,311,332 A * | 1/1982 | Walker | ................ | 294/50.9 |
| 4,424,997 A | 1/1984 | Jackson | | |
| 4,768,331 A | 9/1988 | Jones | | |
| 4,828,690 A * | 5/1989 | Montez | ................ | 209/418 |
| 5,110,168 A | 5/1992 | Petrillo | | |
| 5,205,122 A | 4/1993 | Wong | | |
| 5,246,260 A * | 9/1993 | Racicot | ................ | 294/19.2 |
| 5,305,585 A | 4/1994 | Cousineau | | |
| 5,417,044 A | 5/1995 | Russo | | |
| 5,450,713 A * | 9/1995 | Rohde et al. | ................ | 56/8 |
| 5,511,841 A | 4/1996 | Allen | | |
| 5,662,366 A | 9/1997 | Fraske | | |
| D393,300 S | 4/1998 | Andrews et al. | | |
| D403,133 S | 12/1998 | Bowell et al. | | |
| D406,413 S | 3/1999 | Russo | | |
| 5,921,596 A | 7/1999 | Sheriff et al. | | |
| 6,003,915 A * | 12/1999 | Bierman | ................ | 294/51 |
| 6,199,245 B1 * | 3/2001 | Blessing | ................ | 16/430 |

\* cited by examiner

*Primary Examiner*—Joseph Rodriguez
*Assistant Examiner*—Jonathan R Miller
(74) *Attorney, Agent, or Firm*—Eleanor M. Musick; Procopio Cory Hargreaves & Savitch LLP

(57) ABSTRACT

The multi-purpose rake includes a rake head and a detachable pole for pulling the rake across a surface. The rake head has a frame with two arced end ribs, an upper and a lower crossbar extending between the end ribs. The upper crossbar has a sleeve or other attachment means extending therefrom for receiving and retaining one end of the pole. A wire mesh cage is formed into an arc to conform to the end ribs and is attached to the ribs and the upper and lower crossbar. In the preferred embodiment, the end ribs are formed from a continuous panel so that the ends of the rake head are fully closed. The detachable pole is preferably constructed in multiple sections that can be broken down for easy transport. Optional clips or other retainers may be disposed on the rake head for retaining the pole sections for easy transport and storage. An optional handhold can be provided for facilitating transport of the disassembled rake.

21 Claims, 4 Drawing Sheets

MULTI-PURPOSE RAKE

FIELD OF THE INVENTION

The present invention relates to an apparatus and methods for removing litter and undesirable materials in outdoor settings such as parks, beaches, shorelines and the like.

BACKGROUND OF THE INVENTION

Recreational outings to the beach or shoreline can be disrupted or even ruined by injuries resulting from stepping on or otherwise coming in contact with a partially buried glass shard, fish hook, nail, shell fragment or other sharp object that can puncture unprotected skin. Such objects are typically very difficult to detect visually because they may be completely covered by thin layer of sand or soil, only to be revealed when a person's weight is applied directly on top of the object, when it is too late to avoid contact. While popular public beach areas may be maintained by periodically dragging a large rake across the sand using a tractor or similar motorized vehicle, such rakes capture only the largest objects such as driftwood, large pieces of seaweed, cans, plastic bags or newspapers, leaving behind smaller, sharp objects partially concealed as the sand is raked. Further, such methods can only be used in large, sandy open areas. For beaches that have large rocks protruding through the sand, or areas with scattered plant life, vehicle-drawn rakes cannot be used.

Hand tools designed for sifting debris from sand and soil have been disclosed in the prior art. For example, U.S. Pat. No. 4,828,690 describes a tapered wedge attached to a mesh cage. The wedge is pulled across the surface of the sand or soil by a handle so that wedge ramps debris into the mesh cage. Because the mesh case does not contact the ground, the wedge provides the bulk of the sifting function while the cage acts as a receptacle for holding the collected debris. The wedge tends to be rigid and is fairly bulky, making it rather inconvenient to transport the tool for use on a recreational outing that often involves the need to simultaneously transport toys, beach chairs, towels, picnic gear and other items from a vehicle to the destination.

Another hand tool is the combination sand rake and shovel described in U.S. Pat. No. 5,205,122. The body of the shovel is a mesh material so that, after the head of the shovel is driven into the sand, the sand above the shovel is sifted as the shovel head is lifted upward. While the sifting action may be effective in filtering small objects, a great deal of energy must be expended to clean an area of a square meter or more.

In view of the limitations of prior art devices, the need remains for a hand tool which can be easily transported for use during outings, and which can be used effectively to clean a large enough area to provide room to move about and play without requiring significant exertion by the user. The present invention is directed to such a tool.

BRIEF SUMMARY OF THE INVENTION

It is an advantage of the present invention to provide a multi-purpose rake that can be used to sift debris from sand, soil and water.

It is another advantage of the present invention to provide a rake that can be easily assembled and disassembled to facilitate transportation to an outing site.

In an exemplary embodiment, the present invention comprises a rake head and a detachable pole for pulling the rake across a surface. The rake head comprises a frame with two arced end ribs, an upper and a lower crossbar extending between the end ribs. The upper crossbar has a sleeve or other attachment means extending therefrom for receiving and retaining one end of the pole. A wire mesh cage is formed into an arc to conform to the end ribs and is attached to the ribs and the upper and lower crossbar. In the preferred embodiment, the end ribs are formed from a continuous panel so that the ends of the rake head are fully closed. In an alternate embodiment, the end ribs are strips of metal bent to form the arc with an end bar attached to the upper and lower cross-bar near the open end of the rake head. Additional porous material such as wire mesh or perforated metal sheet is attached to the end bars and the end ribs to enclose the sides of the rake head.

The detachable pole is preferably constructed in multiple sections that can be broken down for easy transport. The sections may be telescoping so that the pole can be collapsed to a shorter length, or the pole may be constructed in separable sections. Means for attachment of the pole sections can be any fastener known in the art, including thumb screws, spring biased pop-up buttons mating with a corresponding hole, bayonet mounts, or mating male and female threaded ends. Similar means for attachment of the pole to the rake head may be used.

In the preferred embodiment, the rake head includes clips or other fasteners to allow all components of the rake to be attached together for storage and to facilitate carrying the rake to an outing site such as a beach, campsite or playground.

BRIEF DESCRIPTION OF THE DRAWINGS

Understanding of the present invention will be facilitated by consideration of the following detailed description taken in conjunction with the accompanying drawings, in which like numerals refer to like parts and in which:

FIG. 3b is a cross-sectional view taken along line B—B of FIG. 3a;

DETAILED DESCRIPTION OF THE EXEMPLARY EMBODIMENTS

Figure 1:
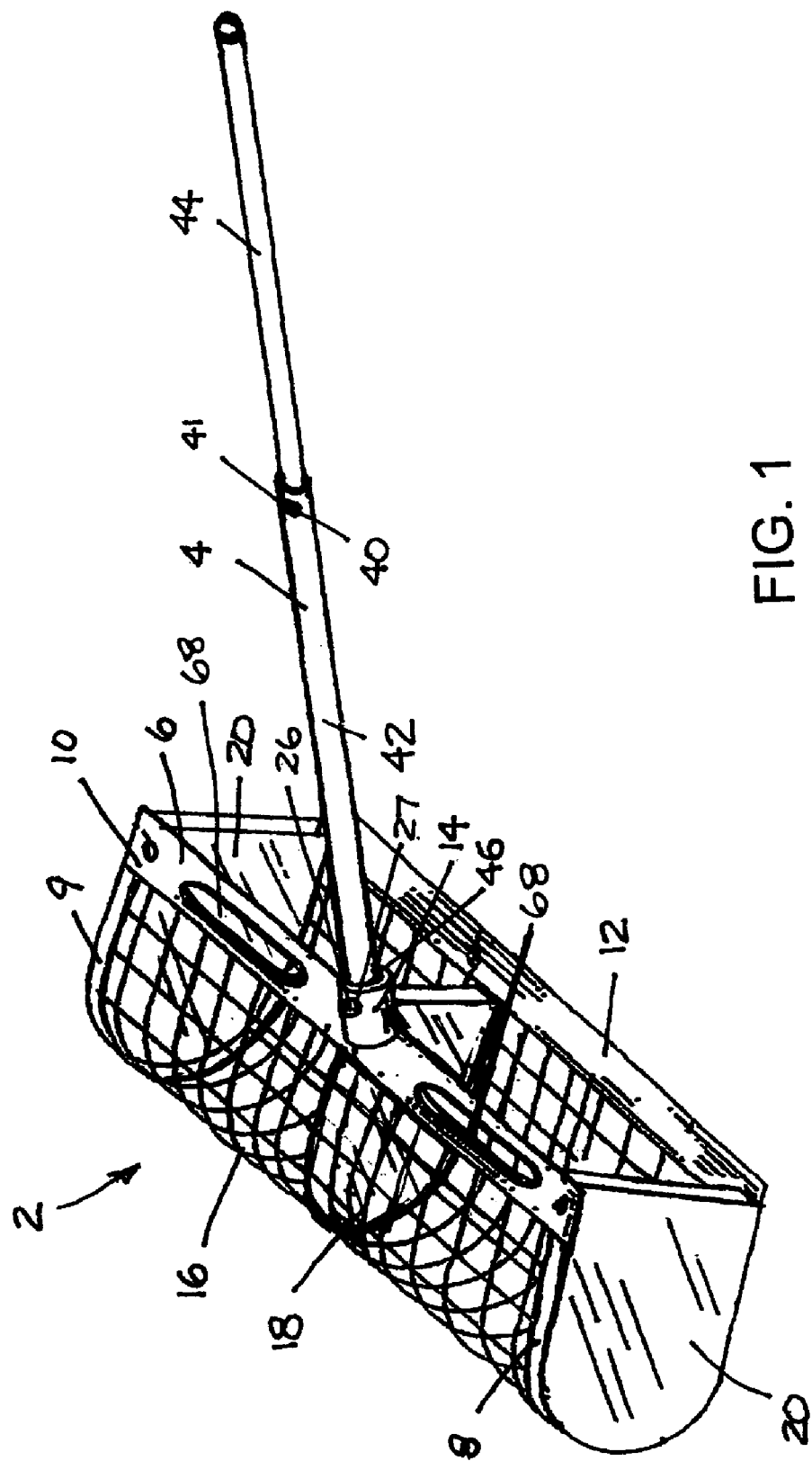
FIG. 1 is a perspective view of an embodiment of the present invention.
Figure 2:
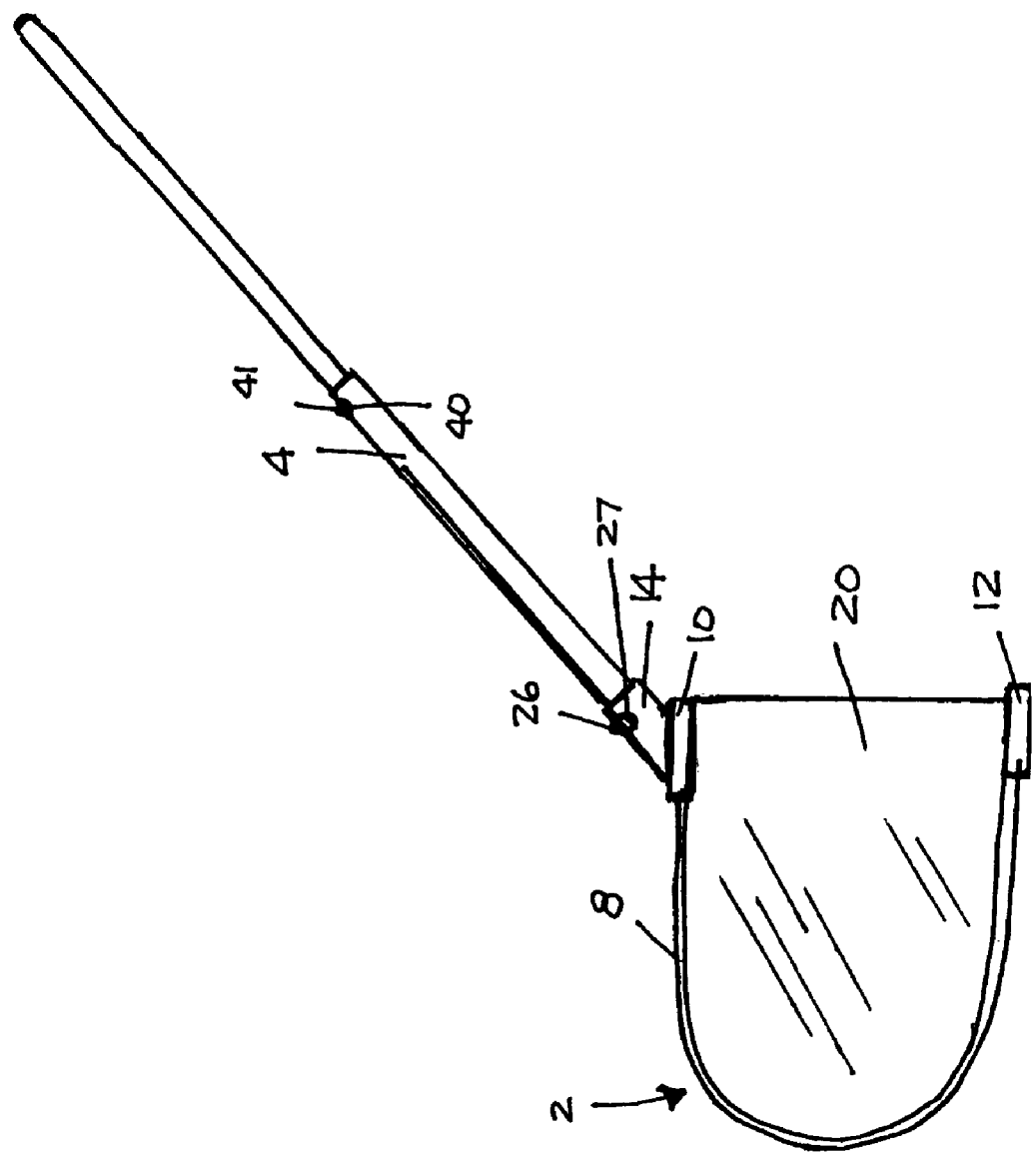
FIG. 2 is a side elevation of the embodiment of FIG. 1.

As illustrated in FIGS. 1–3, the multi-purpose rake of the present invention comprises a rake head 2 and a detachable pole 4 for pulling the rake across a surface. The rake head 2 comprises a frame 6 with two arced end ribs 8, 9, an upper 10 and a lower 12 crossbar extending between the end ribs 8, 9. The upper crossbar 10 has an attachment joint, in this case, sleeve 14, or other attachment means extending therefrom for receiving and retaining one end 42 of the pole 4. A porous cage 16 is formed into an arc to conform to the end ribs 8, 9 and is attached to the ribs 8, 9 and the upper 10 and lower 12 crossbars. In a first embodiment, the porous cage comprises bonded wire mesh such as poultry netting or similar fencing material, formed from aluminum, stainless steel or other appropriate metal, with spacing on the order of 10–15 mm (0.35 to 0.6 in.) In another embodiment, a sheet metal, such as aluminum sheet metal has a large number of bores therethrough, with the bores of sufficient size, e.g., 10–15 mm, to easily pass sand, gravel, or small clumps of soil while trapping items such as fish hooks and glass shards. In the preferred embodiment, the end ribs 8, 9 are formed integrally with a continuous panel 20 which may be solid or hollow, and made of, for example, metal, plastic or other polymer on the order of 5 mm (~0.25 in.) to 38 mm (~1.5 in.) thickness, so that the ends of the rake head are closed. A thicker panel, e.g., approximately 25 mm (1 in.) thick, is preferred so that the edge of the mesh material can be directly attached to the edges of the panel 20. Ideally, lower crossbar 12 will be formed from or coated with a self-lubricating material such as Teflon® or a similar polymer or plastic, or have a hard, smooth finish such as powder-coated metal, that will permit the rake head 2 be drawn through the sand, soil or water with minimal frictional resistance and without dirt or other material clinging to the surface.

Figure 4:
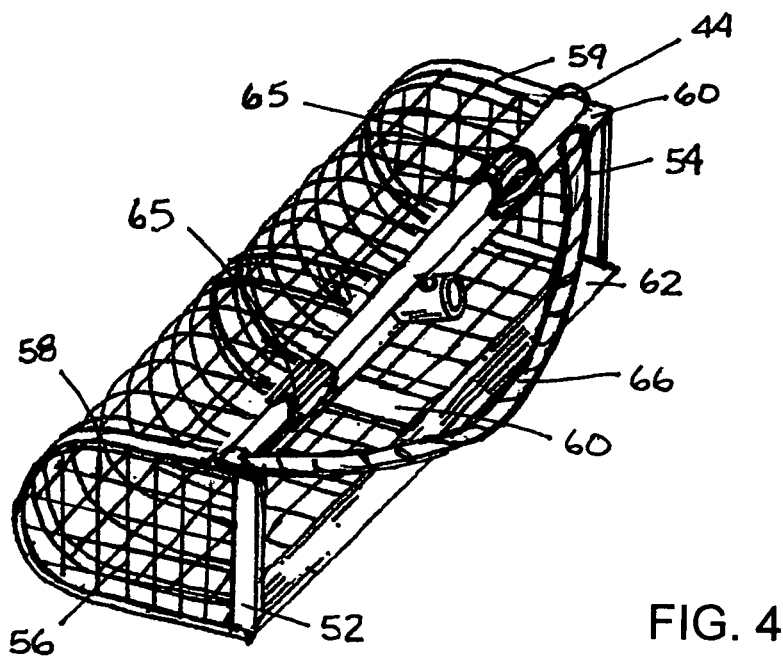
FIG. 4 is a perspective view of a second embodiment of the present invention.

In an alternate embodiment shown in FIG. 4, the end ribs 58, 59 are strips of metal bent to form the arc with an end bar 52, 54 attached to the upper 60 and lower 62 crossbar near the open end of the rake head. Additional porous material such as wire mesh 56 or perforated metal or plastic sheet is attached to the end bars 53, 54 and the end ribs 58, 59 to enclose the sides of the rake head. In the preferred embodiment the rake head has a width on the order of 61 cm (~24 in.)

Figure 3A:
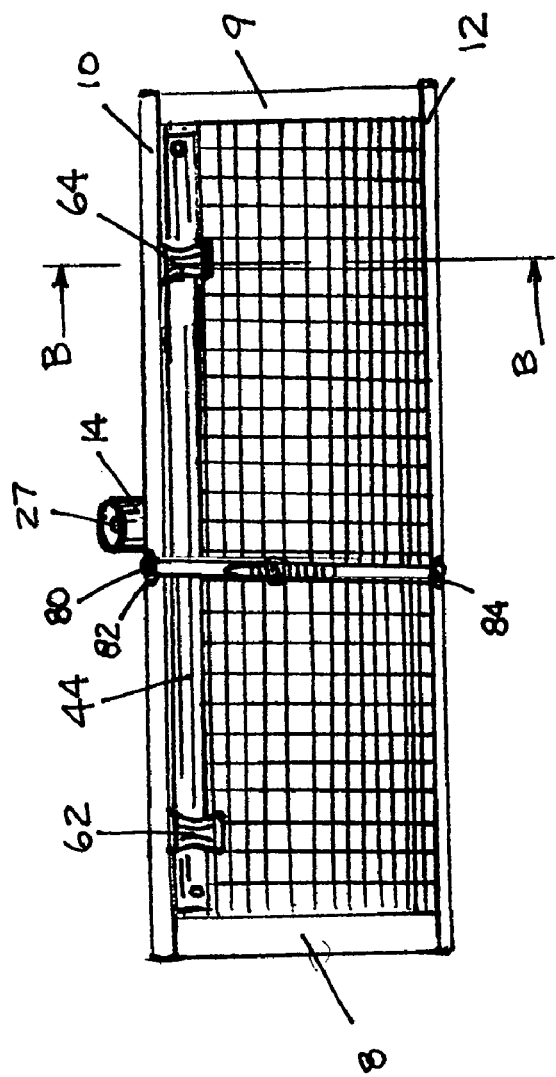
FIG. 3a is a rear elevation of the inventive rake in a disassembled condition.

A center connector is preferably included to maintain the shape of the center of the rake head when resistance is experienced during use. In one embodiment, one or more center ribs with the same configuration as the end ribs can be attached to the upper and lower crossbars to reinforce the rake head and maintain its shape. Alternatively, the center rib may be a rectangular planar piece that extends across the open end of the rake head to join the upper crossbar 10 to the lower crossbar 12 but does not extend to fully span the cross-section of the rake head. In the preferred embodiment, a plastic band such as a cable tie 80, as shown in FIG. 3a, or similar piece which encircles the upper and lower crossbars 10 & 12 near the center of the rake head. Sleeves or channels 82, 84 may be provided in the surfaces of the crossbars to hold the cable tie 80 in position. As shown in FIG. 1, the center rib 18 is formed as a solid panel, similar to end panels 8,9, or, in another alternative embodiment, it may be open as rib 60, such as the end ribs 58, 59 of the embodiment of FIG. 4.

The detachable pole 4 is preferably constructed in multiple sections that can be broken down for easy transport. The sections may be telescoping so that the pole can be collapsed to a shorter length, or the pole may be constructed in separable sections. In the exemplary embodiment, the total pole length is on the order of 120 cm (~48 in.), which may be reduced to about 60 cm (~24 in.) when disassembled or collapsed. As illustrated in the embodiment of FIGS. 1–2, the pole 4 is telescoping, with the upper section 44 fitting into the lower section 46. Means for attachment of the pole sections for assembly can be any fastener known in the art, including the preferred thumb screws, spring biased pop-up buttons mating with a corresponding bore, bayonet mounts, or mating male and female threaded ends. As illustrated, a spring-biased button 41 extending from the surface of upper section 44 is depressed by the inner surface of upper section 44 when the pole is collapsed, but pop out into one or more bores 40 formed in lower section 46 when the button 41 and bore are aligned to lock the pole in its extended position. To collapse the pole, the button 41 is depressed and the upper section 44 is guided into lower section 46. Such fastening mechanisms are well known in the art. The preceding description is provided for illustration and is not intended to be limiting. For example, it would be readily apparent to reverse the telescoping action so that the lower section slides into the upper section, without affecting the function or result.

Similar means for attachment may be used for releasably attaching the pole 4 to the sleeve 14 mounted on rake head 2. For example, a spring-biased button 26 near the lower end of pole 4 is inserted into sleeve 14, which has an inner diameter slightly larger than the outer diameter of lower section 46. A bore 27 formed in sleeve mates with button 26 when they are aligned so that button 26 is projected outward through bore 27, providing a releasable attachment between the pole 4 and rake head 2.

Figure 3B:
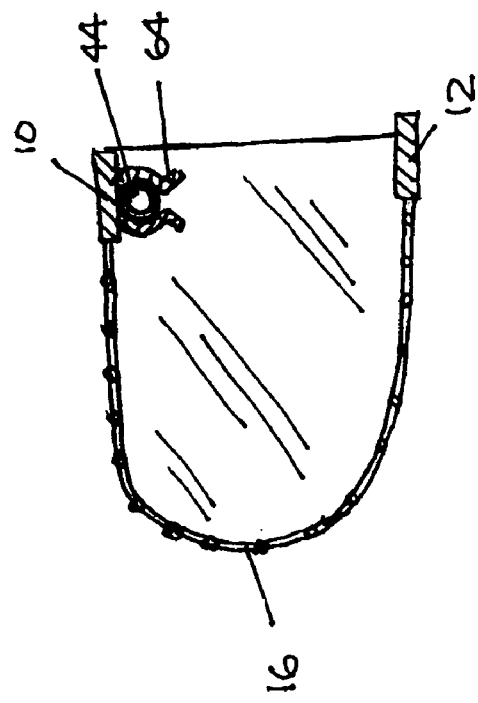
Figure 5:
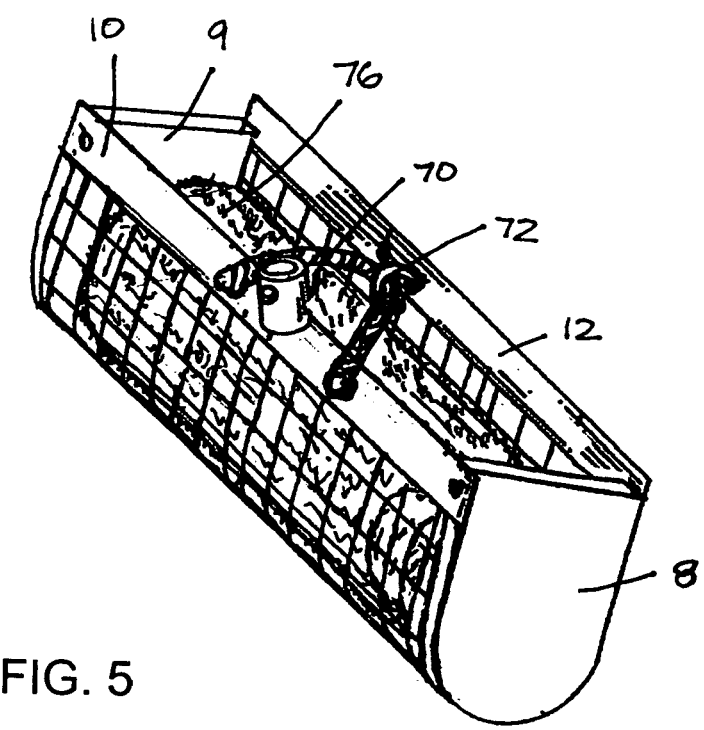
FIG. 5 is a perspective view of an alternate embodiment with a carrying handle.

In one embodiment, the rake head 2 may include optional screws, clips, straps, or other fasteners to allow all components of the rake to be attached together for storage and to facilitate carrying the rake to an outing site such as a beach, campsite or playground. As illustrated in FIGS. 3a and 3b, optional spring clips 62, 64 in the inner surface of upper crossbar 10 are forced apart when a pole section 44 is pressed against their outer ends. As the pole section 44 enters the larger spacing near the lower end of the clips 62, 64, and is pushed toward the upper crossbar, the outer ends snap back in to trap the pole section 44 within the clips. In this embodiment, the relative dimensions of the pole sections 42, 44 and the rake head 2 are such that the pole sections fit closely lengthwise across the interior width of the rake head 2. In alternate embodiments, one or more clips or straps, such as Velcro® hook and pile straps, can optionally be attached to the inner or outer surface of upper crossbar for retaining the disassembled/collapsed pole sections. An example is provided in FIG. 4, with optional straps 65 attached to the upper crossbar 60 for retaining the pole sections. An optional handle or other handhold may be provided for ease in carrying the rake. As examples, FIG. 4 illustrates a simple rope handle 66 attached to upper crossbar 10, while in the embodiment of FIG. 1, one or more optional handholds 68 are formed integrally with, in this case, as slots in, the upper crossbar. As illustrated in FIG. 5, a small hook 72 or loop can be located on the inner surface of the lower crossbar 12 to allow a rope 70 or a bungee cord, strap or other rigid or flexible handle to be extended from the upper crossbar 10 across the open end of the rake head 2 so that it can be carried with the open side facing upward. By carrying the disassembled rake in this manner, other items, for example, one or more beach towels 76 and/or drink containers, can be conveniently placed within the basket formed by rake head 2 for carrying to the outing site. The optional carrying means described above are provided as examples and are not intended to be limiting. Other variations of handles and attachment combinations will be readily apparent to those in the art.

To use the inventive rake, after transport to the outing site, the user removes the pole sections from their holder, extends the pole to its full length by assembling separate pieces or extending the telescoping sections, then attaches the lower end of the pole to the sleeve using the fastener. For example, if the sleeve and pole end have mating threads, the pole is screwed into the sleeve. If the pole has a spring-biased button, the pole end is inserted into the sleeve until the button is aligned with the designated opening in the sleeve.

The head of the rake is placed at an area where activity it expected to occur. For example, if children will be making sand castles, the rake is dragged across the sandy area where they will be playing. If persons will be wading in shallow water, the rake can be placed on the ground under the water's edge then dragged upward, away from the water, or sideways, parallel to the shoreline, to remove hard or sharp objects on top of or embedded near the surface of the ground. The rake is also suitable for collecting plant material, such as accumulated algae or leaves, that may be unpleasant to touch and could conceal a hazard on the ground or under the water's surface, or floating debris such as bottles, papers or plastic bags. Typically, the rake will be pulled at an angle on the order of 30 to 45 degrees as the user moves away from the area being cleaned. Collected materials can be deposited in a garbage can, if available, or simply dragged to a collection point away from the area that is being used. After use, the rake can be disassembled and stored in its compact carrying configuration for transport at the end of the outing.

The rake of the present invention may be used for a number of different applications involving the removal of objects from an area such as a playground, beach, shoreline, yard or other similar setting. The rake provides means for enhancing the safety of recreational locations and is configured for easy transport to such locations. The rake can also be used to remove plant material from shorelines, ponds and pools.

It will be evident that there are additional embodiments which are not illustrated and/or described in the specification and drawings but which are clearly within the scope and spirit of the present invention. The foregoing description and accompanying drawings are, therefore, intended to be exemplary only, and the scope of the invention is to be limited solely by the appended claims.

What is claimed is:

1. A rake, comprising:
   a rake head having a front portion and a rear portion, the rake head comprising a pair of arced end ribs, an upper crossbar and a lower crossbar, each crossbar extending between the end ribs, and a porous material spanning between the pair of end ribs and the upper and lower crossbars to form a cage so that the rear portion of the rake head is open to receive material to be sifted, wherein the upper and lower crossbars each have a length to define a width of the rake head;
   an attachment joint disposed on the upper crossbar;
   a pole having a lower end releasably attached to the attachment joint for guiding the rake head across the material to be sifted, wherein the pole has an upper section and a lower section and is adapted to be extended for use and shortened to a storage length that fits within the width of the rake head;
   at least one retainer for releasably retaining the pole on or in the rake head when the pole is detached from the rake head and shortened to the storage length; and
   a carrying handle disposed on the rake head for carrying the rake head and the detached shortened pole.

2. The rake of claim 1, wherein one of the upper section and the lower section of the pole telescopes relative to the other section.

3. The rake of claim 1, wherein the upper section and the lower section of the pole are separable, and further comprising a releasable fastener for attaching the upper section to the lower section.

4. The rake of claim 1, wherein the pair of end ribs comprises continuous panels, each panel having a panel thickness within the range of 5 mm to 38 mm thick.

5. The rake of claim 4, wherein the panel thickness is on the order of 25 mm.

6. The rake of claim 4, wherein each panel is formed from a plastic or polymer.

7. The rake of claim 1, wherein each end rib of the pair of end ribs comprises an arced metal strip, and the rake head further comprises a porous side panel extending across each end rib to enclose two lateral sides of the rake head.

8. The rake of claim 1, wherein the at least one retainer comprises at least two spring clips disposed along a surface of the upper crossbar adapted for receiving at least one of the upper and lower pole sections.

9. The rake of claim 1, wherein the porous material comprises wire mesh.

10. The rake of claim 1, wherein the porous material comprises sheet metal having a plurality of bores therethrough.

11. The rake of claim 1, wherein the carrying handle comprises a rope, bungee cord or strap.

12. The rake of claim 1, wherein the carrying handle is attached so that the rake head is carried with the open portion of the rake head facing upward.

13. A rake for sifting debris from sand, soil or water, the rake comprising:
   a rake head having a front portion, a rear portion, two lateral sides and a width, wherein the back portion is open and the front portion is enclosed by a porous material having a plurality of openings therein for permitting the sand, soil or water to pass through while capturing the debris;
   a pole removably attached to an upper portion of the rake head for guiding the rake head through the sand, soil or water, the pole comprising separable sections, each separable section having a length generally corresponding to the width of the rake head;
   an attachment means for releasably attaching the pole to the rake head;
   a retaining means disposed on the rake head for holding the separable sections of the pole when the pole is detached from the rake head; and
   a carrying handle disposed on the rake head for carrying the rake head and the separable sections of the detached pole.

14. The rake of claim 13, wherein the separable sections of the pole telescope relative to each other.

15. The rake of claim 13, wherein the separable sections of the pole further comprise a releasable fastener for attaching one section to another section.

16. The rake of claim 13, wherein the lateral sides comprise continuous panels, each panel having a panel thickness within the range of 5 mm to 38 mm thick.

17. The rake of claim 16, wherein each panel is formed from a plastic or polymer.

18. The rake of claim 13, wherein the retaining means comprises at least two spring clips disposed along a surface of the front portion of the rake head adapted for receiving at least one of the separable sections of the pole.

19. The rake of claim 13, wherein the porous material comprises wire mesh.

20. The rake of claim 13, wherein the carrying handle comprises a rope, bungee cord or strap.

21. The rake of claim 13, wherein the carrying handle is attached so that the rake head is carried with the open portion of the rake head facing upward.

* * * * *